United States Patent
Naito (10) Patent No.: US 8,926,048 B2
(45) Date of Patent: Jan. 6, 2015

(54) PRINTING APPARATUS AND PRINTING METHOD FOR PERFORMING PRINTING USING A CONTINUOUS SHEET

(71) Applicant: Canon Kabushiki Kaisha, Tokyo (JP)

(72) Inventor: Hisatsugu Naito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/688,048

(22) Filed: Nov. 28, 2012

(65) Prior Publication Data

US 2013/0088541 A1    Apr. 11, 2013

Related U.S. Application Data

(62) Division of application No. 12/963,089, filed on Dec. 8, 2010, now abandoned.

(30) Foreign Application Priority Data

May 13, 2010    (JP) ................... 2010-111535

(51) Int. Cl.
| | |
|---|---|
| B41J 29/38 | (2006.01) |
| B41J 11/00 | (2006.01) |
| B41J 2/165 | (2006.01) |
| B41J 15/04 | (2006.01) |
| G06K 15/02 | (2006.01) |

(52) U.S. Cl.
CPC ............ *B41J 11/008* (2013.01); *B41J 2/16526* (2013.01); *B41J 11/0095* (2013.01); *B41J 15/04* (2013.01); *B41J 29/38* (2013.01); *G06K 15/022* (2013.01)
USPC ........................................................ 347/16

(58) Field of Classification Search
None
See application file for complete search history.

(56) References Cited

U.S. PATENT DOCUMENTS

| | | | | |
|---|---|---|---|---|
| 2001/0052913 | A1* | 12/2001 | Matsumoto et al. ............ | 347/19 |
| 2002/0001006 | A1* | 1/2002 | Matsumoto et al. ............ | 347/16 |
| 2005/0179198 | A1* | 8/2005 | Biegelsen et al. ............ | 271/303 |

FOREIGN PATENT DOCUMENTS

JP    2001239715 A * 9/2001 ............... B41J 11/42

* cited by examiner

*Primary Examiner* — Geoffrey Mruk
*Assistant Examiner* — Bradley Thies
(74) *Attorney, Agent, or Firm* — Canon USA, Inc., IP Division (57) ABSTRACT

When a splice of a continuous sheet is detected, a printing apparatus defines an unprintable area including the splice on the continuous sheet and continues printing by changing the order in which unit images and maintenance patterns are printed so that the unprintable area is not used for the print operation and a maintenance pattern is printed in an area subsequent to the unprintable area.

21 Claims, 9 Drawing Sheets

| TABLE NUMBER | PATTERN TYPE | NUMBER OF PRINT LINES |
|---|---|---|
| 1 | WHITE SPACE | 2400 |
| 2 | MAINTENANCE | 7200 |
| 3 | WHITE SPACE | 2400 |
| 4 | CLOG MONITOR | 1000 |
| ⋮ | ⋮ | ⋮ |
| 16 | IMAGE 5 | 4800 |
| 17 | CUT MARK | 1000 |
| 18 | IMAGE 6 | 4800 |
| 19 | CUT MARK | 1000 |
| 20 | IMAGE7 | 4800 |
| 21 | CUT MARK | 1000 |
| 22 | CLOG MONITOR | 4800 |
| 23 | PRELIMINARY EJECTION | 1000 |
| 24 | IMAGE8 | 1000 |
| 25 | CUT MARK | 4800 |
| 26 | PRELIMINARY EJECTION | 1000 |
| ⋮ | ⋮ | ⋮ |

| TABLE NUMBER | PATTERN TYPE | NUMBER OF PRINT LINES |
|---|---|---|
| 20' | CLOG MONITOR | 7200 |
| 21' | PRELIMINARY EJECTION | 1000 |
| 22' | WHITE SPACE | 19200 |
| 23' | CLOG MONITOR | 7200 |
| 24' | PRELIMINARY EJECTION | 1000 |
| 25' | CUT MARK | 1000 |
| 26' | PRELIMINARY EJECTION | 1000 |

} A

MERGE

FIG. 8

| TABLE NUMBER | PATTERN TYPE | NUMBER OF PRINT LINES |
|---|---|---|
| 1 | WHITE SPACE | 2400 |
| 2 | CLOG MONITOR | 7200 |
| 3 | WHITE SPACE | 2400 |
| 4 | PRELIMINARY EJECTION | 1000 |
| ⋮ | ⋮ | ⋮ |
| 16 | IMAGE 5 | 4800 |
| 17 | CUT MARK | 1000 |
| 18 | IMAGE 6 | 4800 |
| 19 | CUT MARK | 1000 |
| 20 | IMAGE 7 | 4800 |
| 21 | CUT MARK | 1000 |
| 22 | CLOG MONITOR | 4800 |
| 23 | PRELIMINARY EJECTION | 1000 |
| 24 | IMAGE 8 | 4800 |
| 25 | CUT MARK | 4800 |
| 26 | PRELIMINARY EJECTION | 1000 |
| ⋮ | ⋮ | ⋮ |

REPLACE

| TABLE NUMBER | PATTERN TYPE | NUMBER OF PRINT LINES |
|---|---|---|
| 20 | CLOG MONITOR | 7200 |
| 21 | PRELIMINARY EJECTION | 1000 |
| 22 | WHITE SPACE | 19200 |
| 23 | CLOG MONITOR | 7200 |
| 24 | PRELIMINARY EJECTION | 1000 |
| 25 | CUT MARK | 1000 |
| 26 | PRELIMINARY EJECTION | 1000 |
| 27 | IMAGE 7 | 4800 |
| 28 | CUT MARK | 1000 |
| 29 | IMAGE 8 | 4800 |
| 30 | CUT MARK | 1000 |
| ⋮ | ⋮ | ⋮ |
| 34 | CUT MARK | 1000 |
| 35 | PRELIMINARY EJECTION | 1000 |
| 36 | IMAGE 11 | 4800 |
| 37 | CUT MARK | 1000 |
| 38 | IMAGE 12 | 4800 |
| 39 | CUT MARK | 1000 |
| 40 | IMAGE 13 | 4800 |

A (brace spanning rows 20–26 on right table)

PRINTING APPARATUS AND PRINTING METHOD FOR PERFORMING PRINTING USING A CONTINUOUS SHEET

CROSS REFERENCE OF RELATED APPLICATIONS

This application is a Divisional of U.S. patent application Ser. No. 12/963,089 filed on Dec. 8, 2010 which claims the benefit of Japanese Application No. 2010-111535 filed May 13, 2010, which is hereby incorporated by reference herein in its entirety.

BACKGROUND OF THE INVENTION

1. Field of the Invention

The present invention relates to a printing apparatus that performs printing using a continuous sheet.

2. Description of the Related Art

For high volume printing, such as print labs, a rolled continuous sheet is used. When manufacturing a rolled continuous sheet, a plurality of continuous sheets each having a length smaller than a required length may be connected with a fixing member, such as a splicing tape, (hereinafter simply referred to as a "tape") in order to increase the yield ratio. In this way, the sheet having a required length is rolled. Such a rolled continuous sheet has one or more splices (connecting portions) at random positions at which two sheets are connected with a tape.

An apparatus described in Japanese Patent Laid-Open No. 2001-239715 detects the position of a splice by detecting a tape using an optical sensor. The apparatus performs control so that a certain area including the splice is defined as an unrecordable area and printing is not performed on the unrecordable area. In addition, if an area ahead of the splice cannot contain the entirety of an image of a large size (a second print size), the apparatus changes the sequence of images to be printed so that an image having a smaller size (a first print size) is printed in the area first.

SUMMARY OF THE INVENTION

A nozzle of an inkjet print head that is infrequently used may have an ink ejection error. To prevent the occurrence of such an ink ejection error, periodical head maintenance is needed. Even when a plurality of images are sequentially printed on a continuous sheet, it is desirable that periodical head maintenance be performed by ejecting ink from all of the nozzles and forming a maintenance pattern on the sheet each time a predetermined number of images have been printed.

However, the apparatus described in Japanese Patent Laid-Open No. 2001-239715 does not take into account such head maintenance. The apparatus only defines a splice as an unrecordable area. For an unrecordable area, all of the nozzles of the print head do not eject ink and the operation of the print head stops. Thus, a nozzle may become clogged due to ink drying during the inoperable period. If a nozzle becomes clogged, an image artifact occurs in an image printed in an area subsequent to the unrecordable area.

Accordingly, the present invention provides a technique for, when sequentially printing a plurality of images on a continuous sheet including an unsuitable area that is not suitable for image printing, avoiding an image from being printed in the unsuitable area and excellently printing an image in an area subsequent to the unsuitable area.

According to an embodiment of the present invention, an apparatus includes a sheet feeding unit configured to feed a continuous sheet along a path, a printing unit configured to perform a print operation to print unit images and maintenance patterns in a determined order on the continuous sheet fed from the sheet feeding unit, a detection unit disposed between the sheet feeding unit and the printing unit in the path and configured to detect a splice of the continuous sheet, and a control unit configured to control so as to define an unprintable area including the splice, where the unit image is not to be printed on the continuous sheet when the detection unit detects the splice, and change the determined order so that a maintenance pattern is printed in an area subsequent to the unprintable area and the print operation continues while avoiding the unprintable area.

According to the present invention, printing an image onto an unsuitable area, such as a splice, can be prevented. In addition, a maintenance pattern is formed in an area subsequent to the unsuitable area, and maintenance of a print head is performed using the maintenance pattern. As a result, printing an image onto an area subsequent to an unsuitable area can be excellently performed.

Further features of the present invention will become apparent from the following description of exemplary embodiments with reference to the attached drawings.

DESCRIPTION OF THE EMBODIMENTS

A printing apparatus using an inkjet printing method according to an embodiment of the present invention is described below. According to the present embodiment, a printing apparatus employs a long continuous sheet (a long continuous sheet that is longer than repeated units of printing in the conveying direction (the unit is referred to as a "page" or a "unit image")). The printing apparatus is a high-speed line printer that is operable in either one of a simplex print mode and a duplex print mode. The printing apparatus is suitable for a high-volume printing market, such as print labs. As used herein, even when a plurality of small images, characters, and white spaces are present in an area of a unit of printing (a page), the small images, characters, and white spaces are collectively referred to as a "unit image". That is, the term "unit image" refers to a unit of printing (a page) when a plurality of pages are sequentially printed on a continuous sheet. Note that a unit image is also simply referred to as an "image". The length of a unit image varies in accordance with the image size to be printed. For example, the length of an L size photo in the conveying direction is 135 mm, and the length of an A4 size photo in the conveying direction is 297 mm. The present invention is widely applicable to a printing apparatus that uses ink and requires an ink drying process, such as a printer, a multi function peripheral, a copier, a facsimile, or equipment used for manufacturing a variety of devices.

Figure 1:
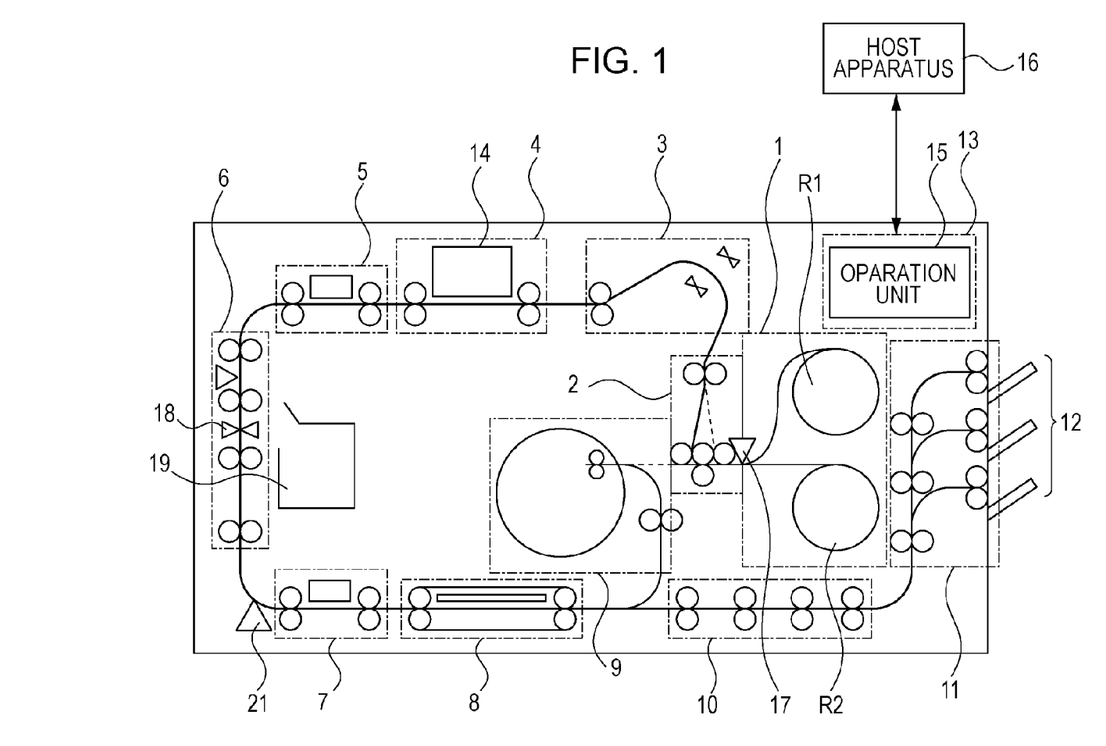
FIG. 1 is a schematic illustration of the internal configuration of a printing apparatus.

FIG. 1 is a cross-sectional view schematically illustrating the internal configuration of the printing apparatus. According to the present embodiment, the printing apparatus can perform duplex printing on the first surface of a rolled sheet and the second surface of the sheet which is a back face of the first surface. The printing apparatus includes a sheet feeding unit 1, a decurl unit 2, a skew correction unit 3, a printing unit 4, an inspection unit 5, a cutter unit 6, an information recording unit 7, a drying unit 8, an reverse unit 9, an ejection conveying unit 10, a sorter unit 11, an ejection unit 12, and a control unit 13. The ejection unit 12 includes the sorter unit 11. The ejection unit 12 ejects the sheet. The sheet is conveyed by a conveying mechanism including rollers and a belt along a sheet conveying path shown as a solid line in FIG. 1 and is processed by the units. At any point in the sheet conveying path, the side adjacent to the sheet feeding unit 1 is referred to as "upstream", and the side opposite to the side adjacent to the sheet feeding unit 1 is referred to as "downstream".

The sheet feeding unit 1 holds a rolled continuous sheet and feeds the continuous sheet. The sheet feeding unit 1 can contain two rolls R1 and R2. The sheet feeding unit 1 selects one of the rolls R1 and R2 and draws a sheet from the selected roll and feeds the sheet. Note that the number of rolls contained in the sheet feeding unit 1 is not limited to two. For example, the number of contained rolls may be one or three or more. Alternatively, a continuous sheet that is not rolled can be used. For example, a continuous sheet having perforations at predetermined intervals may be folded at the perforations and stacked in the sheet feeding unit 1.

The continuous sheet used in the present embodiment has at least one splice (a connecting portion) in which two sheets are connected using an adhesive tape or a glue at a random position. The splice is considered as an unsuitable area that is not suitable for image printing. A splice sensor 17 is disposed in the vicinity of the exit of the sheet feeding unit 1. The splice sensor 17 detects a splice of the continuous sheet fed from the sheet feeding unit 1. The splice sensor 17 is described in more detail below.

The decurl unit 2 reduces the curl of the sheet fed from the sheet feeding unit 1. The decurl unit 2 allows the sheet to pass therethrough using two pinch rollers corresponding to one driving roller in order to curve the sheet so that an inverse curl is fed to the sheet. In this way, a decurling force is applied to the sheet and, therefore, the curl is reduced.

The skew correction unit 3 corrects the skew of the sheet that has passed through the decurl unit 2 (the inclination of the sheet with respect to the designed feed direction). By urging the end of the sheet on the reference side against a guide member, the skew can be corrected. In the skew correction unit 3, a loop of the conveyed sheet is formed.

The printing unit 4 performs a printing operation on the sheet and forms an image on the sheet using a print head assembly 14 disposed above the conveyed sheet. That is, the printing unit 4 serves as a processing unit that performs a predetermined processing on the sheet. The printing unit 4 includes a plurality of conveying rollers that convey the sheet. The print head assembly 14 includes a line print head having an inkjet nozzle row that covers the maximum width of the sheet to be used. In the print head assembly 14, a plurality of print heads are arranged in parallel along the conveying direction. In this example, the print head assembly 14 includes seven print heads corresponding to the following seven colors: cyan (C), magenta (M), yellow (Y), light cyan (LC), light magenta (LM), grey (G), and black (K). However, it should be noted that the number of colors and the number of print heads are not limited to seven. Examples of the inkjet method include a method using a heater element, a method using a piezoelectric element, a method using an electrostatic element, and a method using a microelectromechanical system (MEMS) element. The ink of each color is supplied from an ink tank to the print head assembly 14 via an ink tube.

The inspection unit 5 optically scans, using a scanner, an inspection pattern or an image printed on a sheet by the printing unit 4 and inspects the state of a nozzle of the print head, the conveying state of a sheet, and the position of an image. In this way, the inspection unit 5 determines whether an image has been correctly printed. The scanner includes a charge-coupled device (CCD) image sensor or a complementary metal-oxide semiconductor (CMOS) image sensor.

The cutter unit 6 includes a mechanical cutter 18 that cuts the printed sheet into predetermined lengths. The cutter unit 6 further includes a cut mark sensor that optically detects a cut mark recorded on the sheet and a plurality of conveying rollers that convey the sheet to the next processing stage. A trash can 19 is disposed in the vicinity of the cutter unit 6. The trash can 19 contains small sheet tips generated by and output from the cutter unit 6 as trash. The cutter unit 6 includes a dispatching mechanism that determines whether the cut sheet is output to the trash can 19 or the original conveying path.

The information recording unit 7 records print information (unique information), such as the serial number of the printout and the date and time, in the non-print area of the cut sheet. The information is recorded by printing characters and code using, for example, an inkjet method or a thermal transfer method.

The drying unit 8 heats the sheet printed by the printing unit 4 so as to dry the applied ink in a short time. In the drying unit 8, heated air is applied to the sheet that passes through the drying unit 8 in at least the upward direction. Note that instead of applying heated air, the drying unit 8 can dry the ink by irradiating the surface of the sheet with electromagnetic waves (e.g., ultraviolet rays or infrared rays).

As used herein, the above-described sheet conveying path from the sheet feeding unit 1 to the drying unit 8 is referred to as a "first path". The first path has a shape so as to perform a U-turn between the printing unit 4 and the drying unit 8. The cutter unit 6 is located in the U-turn.

The reverse unit 9 temporarily winds the printed continuous sheet and turns over the sheet when duplex printing is performed. In order to feed the sheet that has passed through the drying unit 8 to the printing unit 4 again, the reverse unit 9 is disposed in a path from the drying unit 8 to the printing unit 4 via the decurl unit 2 (a loop path, hereinafter referred to as a "second path"). The reverse unit 9 includes a winding rotary member (a drum) that rotates to reel in the sheet. The printed continuous sheet before being cut is temporarily wound around the winding rotary member. After the continuous sheet is wound, the winding rotary member rotates in the opposite direction and, therefore, the continuous sheet is fed in a direction opposite that when the continuous sheet is wound. The continuous sheet is fed to the decurl unit 2 and is delivered to the printing unit 4. Since the sheet is turned over, the printing unit 4 can perform a printing operation on the back surface of the sheet. If the sheet feeding unit 1 is referred to as a "first sheet feeding unit", the reverse unit 9 can be referred to as a "second sheet feeding unit." Such duplex printing is described in more detail below.

The ejection conveying unit 10 conveys the sheet cut by the cutter unit 6 and dried by the drying unit 8 and delivers the sheet to the sorter unit 11. The ejection conveying unit 10 is disposed in a path that is different from the second path having the reverse unit 9 thereon (hereinafter, referred to as a "third path"). In order to selectively deliver the sheet that has been conveyed along the first path to the second path or the third path, a path switching mechanism including a movable flapper is disposed at a branch position in the path (also referred to as an "ejection branch position").

The ejection unit 12 including the sorter unit 11 is disposed at the end of the third path so as to be adjacent to the sheet feeding unit 1. The sorter unit 11 sorts the printed sheets into groups as needed. The sorted sheets are ejected onto a plurality of trays of the ejection unit 12. In this way, the third path has a layout that allows a sheet to pass beneath the sheet feeding unit 1 and allows the sheet to be ejected to the opposite side of the sheet feeding unit 1 from the printing unit 4 and the drying unit 8.

As described above, the units from the sheet feeding unit 1 to the drying unit 8 are sequentially arranged along the first path. Downstream of the drying unit 8, the first path branches into the second path and the third path. The reverse unit 9 is disposed in the middle of the second path. Downstream of the reverse unit 9, the second path merges with the first path. The ejection unit 12 is disposed at the end of the third path.

The control unit 13 performs overall control of the printing apparatus. The control unit 13 includes a controller having a central processing unit (CPU), a storage unit, and a variety of control sub-units, an external interface, and an operation unit 15 used by the user when the user inputs data and receives output data. The operation performed by the printing apparatus is controlled using instructions received from the controller or a host apparatus 16, such as a host computer, connected to the controller via the external interface.

Figure 2:
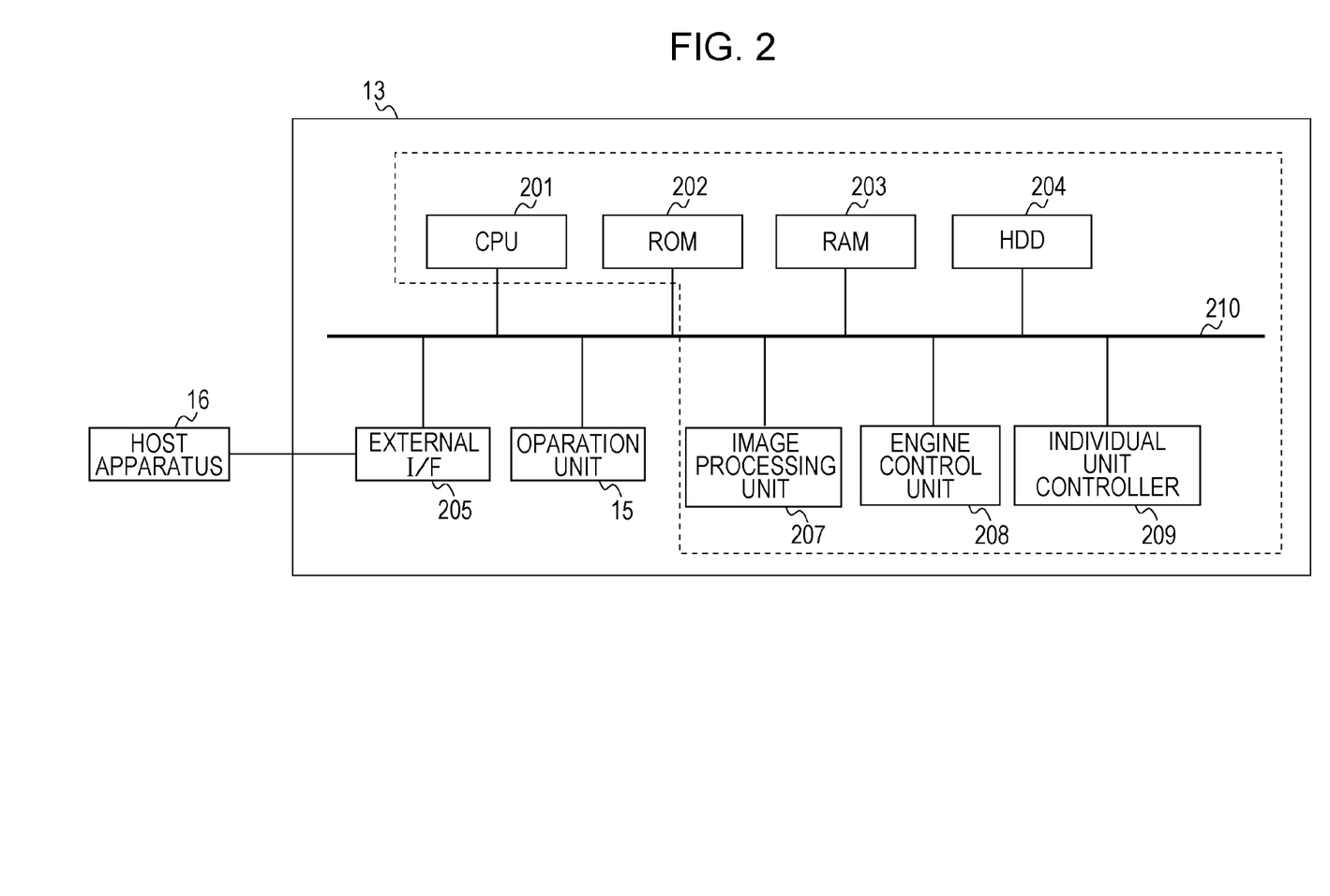
FIG. 2 is a block diagram of a control unit.

FIG. 2 is a block diagram schematically illustrating the control unit 13. The controller (a block enclosed by a dashed line) included in the control unit 13 includes a CPU 201, a read only memory (ROM) 202, a random access memory (RAM) 203, a hard disk drive (HDD) 204, an image processing unit 207, an engine control unit 208, an individual unit controller 209. The CPU 201 performs overall control of the printing apparatus. The ROM 202 stores programs executed by the CPU 201 and fixed data necessary for the printing apparatus to perform a variety of operations. The RAM 203 is used as a work area of the CPU 201 and a temporary storage area for a variety of received data items. In addition, the RAM 203 stores a variety of setting data items. The HDD 204 can store and deliver programs executed by the CPU 201, print data, and setting information necessary for the operation performed by the printing apparatus. The operation unit 15 serves as an input/output interface with the user. The operation unit 15 includes hard keys, an input unit of a touch-sensitive panel, and a display and a sound generator for outputting information.

The units that are required to perform a high-speed operation include dedicated processing unit. The image processing unit 207 performs image processing on print data manipulated by the printing apparatus. The image processing unit 207 converts the color space of the input image data (e.g., YCbCr) into a standard RGB color space (e.g., sRGB). In addition, the image processing unit 207 performs a variety of image processing, such as resolution conversion, image analysis, and image correction, on the image data as needed. Print data obtained through such image processing is stored in the RAM 203 or the HDD 204. In response to a control command received from the CPU 201, the engine control unit 208 controls driving of the print head assembly 14 of the printing unit 4 using the print data. The engine control unit 208 further controls a conveying mechanism of each of the units in the printing apparatus. The individual unit controller 209 is a sub-controller that individually controls the sheet feeding unit 1, the decurl unit 2, the skew correction unit 3, the inspection unit 5, the cutter unit 6, the information recording unit 7, the drying unit 8, the reverse unit 9, the ejection conveying unit 10, the sorter unit 11, and the ejection unit 12. In response to an instruction received from the CPU 201, the individual unit controller 209 controls the operation of each of the units. An external interface 205 is an interface (I/F) used for connecting the controller to the host apparatus 16. The external interface 205 is a local I/F or a network I/F. The above-described components of the printing apparatus are connected to one another via a system bus 210.

The host apparatus 16 serves as a supply source of image data to be printed by the printing apparatus. The host apparatus 16 may be a general-purpose computer or a dedicated computer. Alternatively, the host apparatus 16 may be a dedicated imaging device, such as an image capturing device including an image reader unit, a digital camera, or a photo storage device. When the host apparatus 16 is a computer, a storage unit of the computer stores an operating system (OS), application software that generates image data, and a printer driver for the printing apparatus installed therein. However, it should be noted that all of the above-described processes are not necessarily realized by software. Some or all of the processes may be realized by hardware.

The basic operation performed during a printing operation is described next. The operation in a simplex print mode differs from that in a duplex print mode. Accordingly, both the operations are described below.

In a simplex print mode, a sheet is fed from the sheet feeding unit 1 and is subjected to the processing performed by the decurl unit 2 and the skew correction unit 3. Thereafter, printing is performed on the front surface (the first surface) of the sheet in the printing unit 4. Printing of an image having a predetermined unit length in the conveying direction (a unit image) is sequentially performed on the continuous sheet. Thus, a plurality of images are formed so as to be sequentially arranged on the continuous sheet. The printed sheet passes through the inspection unit 5 and is cut into the unit images by the cutter unit 6. The print information is printed on the back surfaces of the cut sheets in the information recording unit 7 as needed. Subsequently, the cut sheets are conveyed to the drying unit 8 one by one, where each of the sheets is dried. Thereafter, each of the sheets passes through the ejection conveying unit 10 and is sequentially ejected and stacked on the ejection unit 12 of the sorter unit 11. In contrast, the sheet remaining on the side of the printing unit 4 after the last unit image is cut out is delivered back to the sheet feeding unit 1. The sheet is wound around the roll R1 or R2. In this way, in a simplex print mode, the sheet passes through the first path and the third path. The sheet does not pass through the second path.

In contrast, in a duplex print mode, after first print sequences on the front surface (the first surface) are completed, second print sequences on the back surface (the second surface) are performed. In the first print sequences, the operations performed by the sheet feeding unit 1 to the inspection unit 5 are the same as those in the simplex print mode. However, the cutting operation is not performed by the cutter unit 6. The continuous sheet is conveyed to the drying unit 8. The drying unit 8 dries the ink on the front surface of the continuous sheet. Thereafter, the sheet is led to the path on the side of the reverse unit 9 (the second path), not the path on the side of the ejection conveying unit 10 (the third path). In the second path, the sheet is reeled in around the winding rotary member of the reverse unit 9 that rotates in the forward direction (the counterclockwise direction in FIG. 1). After the printing on planned area of the front surface is completed in the printing unit 4, the trailing edge of the printed area of the continuous sheet is cut by the cutter unit 6. The entirety of the portion of the continuous sheet downstream of the cut position (on the side of the printed area) in the conveying direction is rewound by the reverse unit 9 via the drying unit 8. In contrast, at the same time as the rewinding operation performed by the reverse unit 9, the portion of the continuous sheet remaining upstream of the cut position (on the side of the printing unit 4) in the conveying direction is fed back to the sheet feeding unit 1 and reeled in around the roll R1 or R2 so that the leading edge of the portion (the cut edge) does not remain in the decurl unit 2. Through such rewinding operation (feedback), the sheet does not collide with the sheet that is subsequently fed for the back surface printing described below.

After the above-described front surface printing sequences are completed, the processing is switched to the back surface printing sequences. The winding rotary member of the reverse unit 9 rotates in a direction (a clockwise direction in FIG. 1) that is the reverse of the direction when the sheet was reeled in. The edge of the wound sheet (the trailing edge of the sheet when reeled is changed to the leading edge when fed) is conveyed into the decurl unit 2 along the path shown as a dashed line in FIG. 2. A curl of the sheet given by the winding rotary member is decurled in the decurl unit 2. That is, the decurl unit 2 is disposed between the sheet feeding unit 1 and the printing unit 4 in the first path and is disposed between the reverse unit 9 and the printing unit 4 in the second path. In either path, the decurl unit 2 serves as a shared unit for decurling. The turned-over sheet is advanced to the printing unit 4 via the skew correction unit 3, and printing on the back surface of the sheet is performed. The printed sheet passes through the inspection unit 5 and is cut into sheets each having a preset unit length by the cutter unit 6. Since either side of each of the cut sheets is printed, recording is not performed by the information recording unit 7. The cut sheets are conveyed to the drying unit 8 one by one. Thereafter, the cut sheets are sequentially ejected to the sorter unit 11 of the ejection unit 12 via the ejection conveying unit 10. In this way, in the duplex print mode, the sheet passes through the first path, the second path, the first path, and the third path and is processed.

Figure 3:
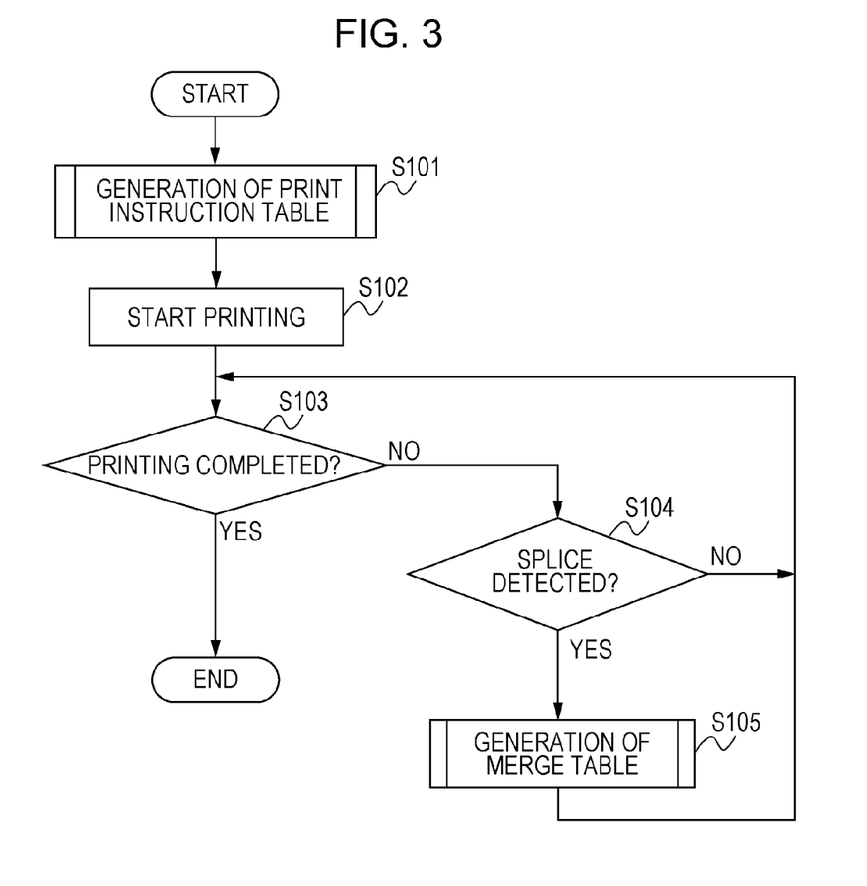
FIG. 3 is a flowchart illustrating all of the sequences of a printing operation controlled by the control unit.

FIG. 3 is a flowchart illustrating all of the sequences of a printing operation controlled by the control unit 13. In step S101, an initial print instruction table is generated in a memory in response to a print instruction. The print instruction table is used for sequentially printing unit images and maintenance patterns in a predetermined order. The print instruction table is described in more detail below.

In step S102, unit images and maintenance patterns are sequentially printed in the predetermined order indicated by the generated print instruction table. In step S103, it is determined whether printing indicated by the print instruction table is completed (Yes) or not (No). If the determination is "Yes", the sequence is completed. However, if the determination is "No", the processing proceeds to step S104, where it is determined whether a splice of the continuous sheet is detected by the splice sensor 17 during the printing operation (Yes) or not (No). If the determination is "Yes", the processing proceeds to step S105. However, if the determination is "No", the processing returns to step S103 and the processing is repeated. In step S105, the print instruction table is updated in accordance with the detected position of the splice (the detected timing). In order to update the print instruction table, a merge table of a pattern group including an unprintable area (a white space) and two maintenance patterns that sandwich the unprintable area is used. Thereafter, the processing returns to step S103 and the processing is repeated. The procedure for updating the print instruction table is described in more detail below.

The splice of the sheet is thicker than the other original portion of the sheet. Accordingly, if a narrow gap is employed, the splice may be in contact with the print head. Therefore, when the splice passes through the position that faces the print head during a printing operation, the print head assembly 14 is temporarily moved away from a surface of the sheet so that the gap increases and the splice is not in contact with the nozzle of the print head. After the splice has passed through the gap, the increased gap size returns to the original size that is suitable for a print operation.

In step S104, when a splice of a fed continuous sheet S passes through a detection position (immediately beneath the splice sensor 17), the signal level of the splice sensor 17 varies and, thus, passing of the splice is detected. The splice sensor 17 is formed from a reflective photosensor, which detects a difference between the surface reflectivities of the sheet and the splice (the tape) or the stepped edge of the splice using the amount of the reflected light. Note that the splice sensor 17 may be formed from a transmissive photosensor that can detect a splice using a difference between the light transmissivities of the sheet and the splice. Still alternatively, the splice sensor 17 may be formed from a contact sensor, not an optical sensor. The contact sensor can detect a splice by detecting a variation in the thickness of the splice using a variation in an amount of movement of a contact tip that is in contact with the continuous sheet S.

Figure 4A:
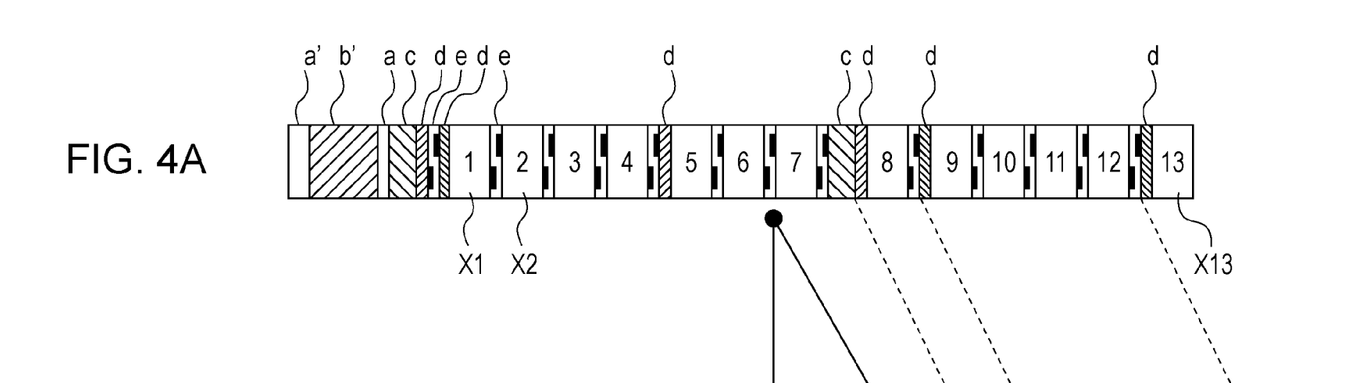
FIGS. 4A and 4B illustrate the order in which unit images are printed in accordance with information in a print instruction table.
Figure 4B:
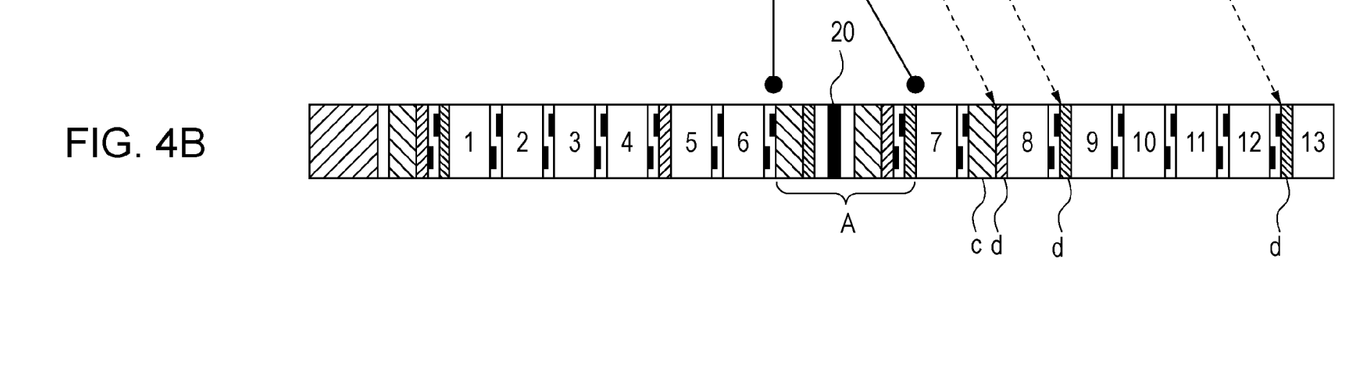

FIGS. 4A and 4B illustrate the order in which unit images and maintenance patterns are sequentially printed on the continuous sheet S in accordance with the information in the print instruction table. FIG. 4A illustrates the order indicated by the initial print instruction table generated in step S101. FIG. 4B illustrates the order indicated by the print instruction table updated in step S105. In FIG. 4B, a splice 20 appears during a print operation. In FIGS. 4A and 4B, in addition to a unit image, examples of the patterns include a white space, a maintenance image (e.g., a clog monitor pattern or a preliminary ejection pattern), and a cut mark (a margin area). In the example shown in FIGS. 4A and 4B, the following patterns are arranged from the leading edge of the sheet: a white space a, a maintenance pattern b, a white space a, a clog monitor pattern c, a preliminary ejection pattern d, a cut mark e, a preliminary ejection pattern d, a unit image x1, a cut mark f, a unit image x2, . . . , and a unit image x13. In general, the maintenance pattern is formed at predetermined intervals. The predetermined intervals vary in accordance with the size of the unit image (the number of print lines) in the conveying direction. In this example, as shown in FIG. 4A, each time four unit images or a set of three unit images and one clog monitor pattern are printed in accordance with the initial print instruction table, a preliminary ejection operation is performed and a preliminary ejection pattern is repeatedly formed. The reference symbol "A" shown in FIG. 4B represents the predetermined pattern sequence that is inserted into the pattern due to an update operation. The splice 20 is located in the middle of the predetermined pattern sequence.

Figure 5:
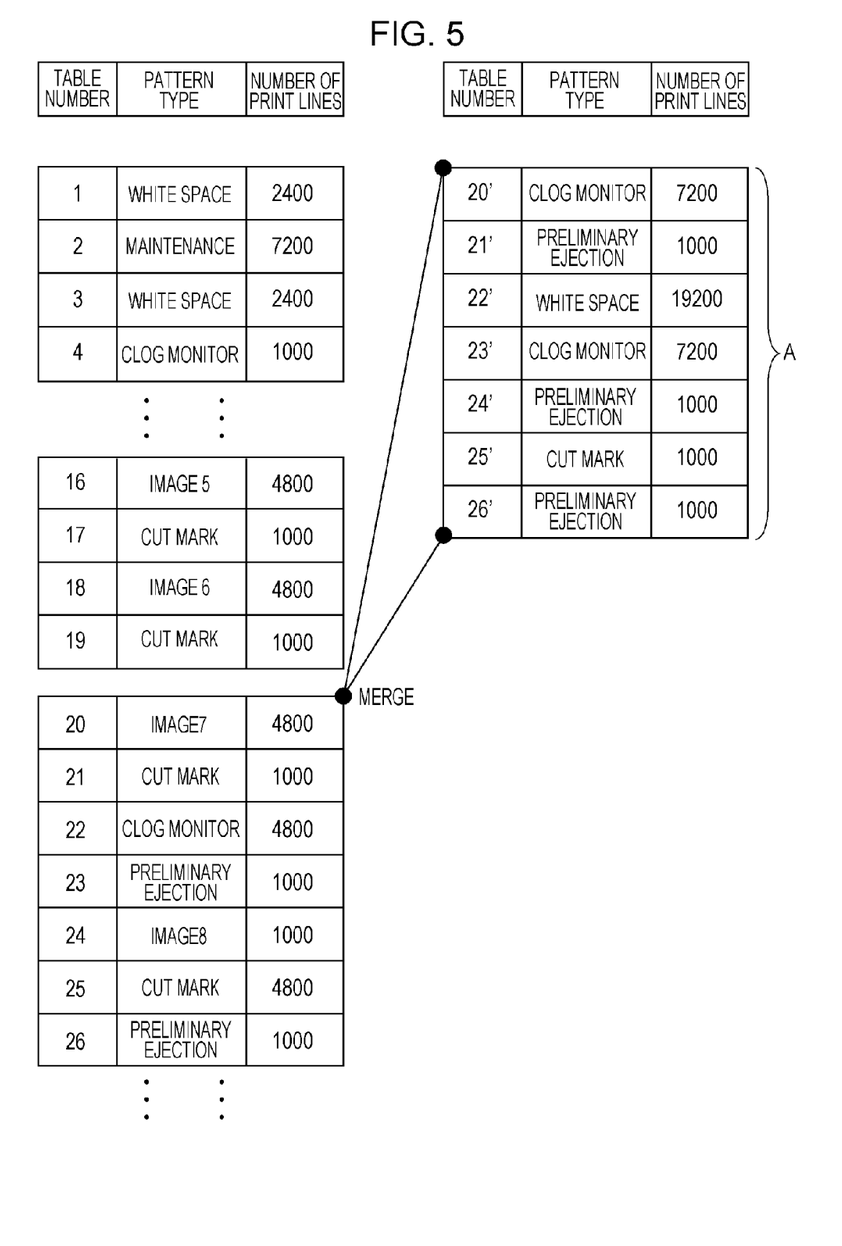
FIG. 5 illustrates the procedure for updating the print sequence defined in the print instruction table.

FIG. 5 illustrates the procedure for updating the initial print instruction table. The data used for updating includes entries each including a table number, the type of pattern, and the number of print lines (corresponding to the length in the conveying direction). Such data is stored in the memory in the form of a table. A merge table A is inserted into a point corresponding to the detection position (the detection timing) of the splice 20 (i.e., an additional instruction group is inserted into the initial print instruction table). In this example, a merge table having table numbers 20' to 24' is inserted into a point between the entry having a table number of 19 and the entry having a table number of 20. The table number 20' indicates a clog monitor pattern. The table number 21' indicates a preliminary ejection pattern. The table number 22' indicates a white space. The table number 23' indicates a clog monitor pattern. The table number 24' indicates a preliminary ejection pattern. The table numbers 20' and 21' indicate maintenance patterns located downstream of an unprintable area (the white space indicated by the table number 22') including the splice 20. The table numbers 23' to 26' indicate maintenance patterns (including a cut mark) located upstream of an unprintable area (the white space indicated by the table number 22') including the splice 20. That is, maintenance of the print head is performed before and after the unprintable area has passed.

Figure 6:
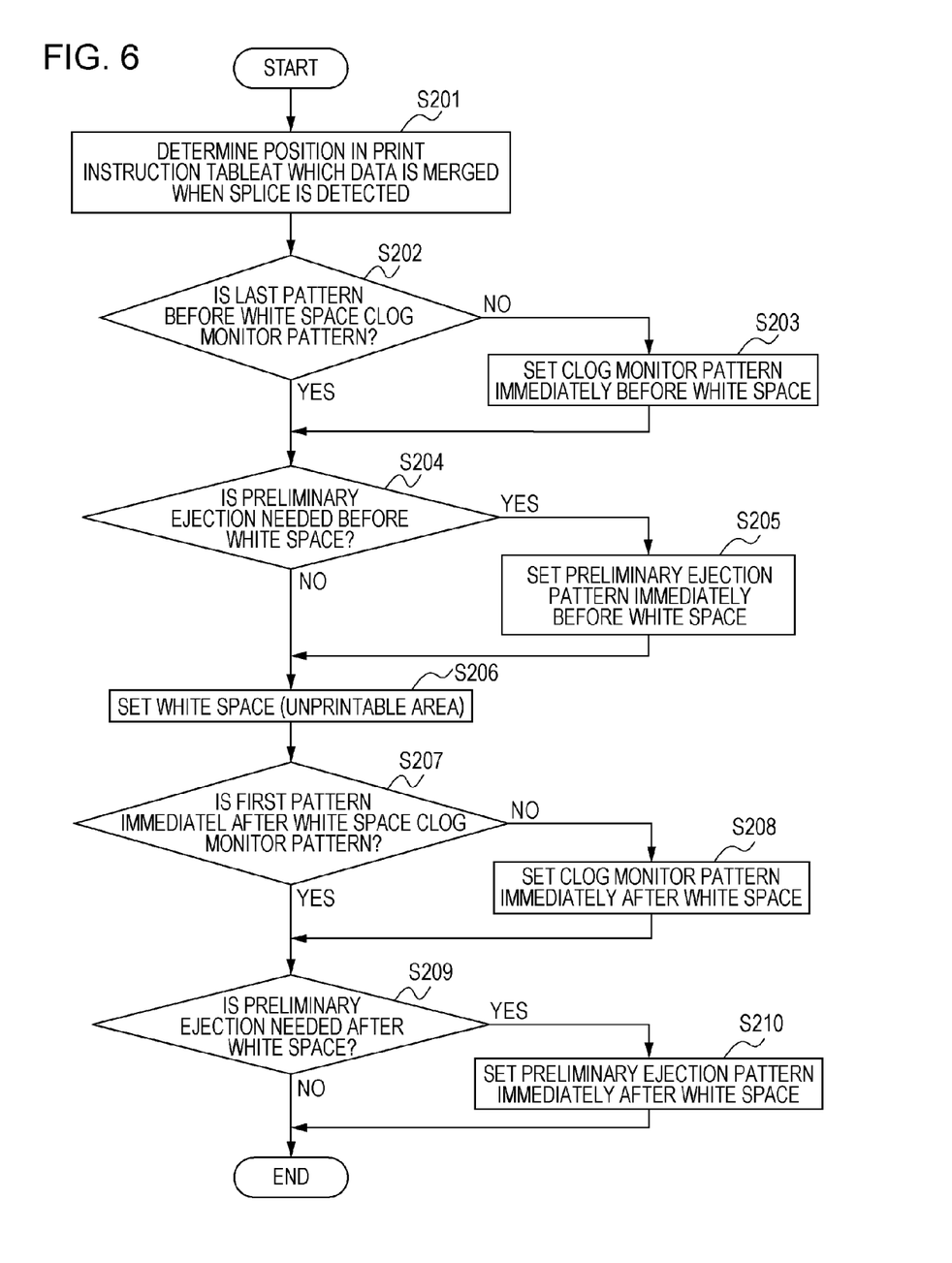
FIG. 6 is a flowchart of the procedure for updating the print instruction table.

FIG. 6 is a flowchart of the procedure for updating a print instruction table in step S105. In step S201, when the splice 20 is detected, it is determined at which point of the print instruction table the merge table is merged. The point is determined by performing computation using the point (the timing) at which the splice sensor 17 detects the splice 20 and the number of print lines in the print instruction table. In step S202, it is determined whether the last pattern before merge is a clog monitor pattern (Yes) or not (No) by referring to the print instruction table. If the determination is "Yes", the processing proceeds to step S204. However, if the determination is "No", the processing proceeds to step S203, where a clog monitor pattern (refer to the table number 20' shown in FIG. 5) is set at the top of the merge table. In step S204, it is determined whether a preliminary ejection operation is needed (Yes) or not (No) using the print pattern before merge. The preliminary ejection operation is needed for the maintenance of the print head at predetermined time intervals (for each conveying distance). If the case in which the preliminary ejection operation is needed in an unprintable area (described in more detail below) occurs, it is determined that the preliminary ejection operation is needed in advance. If the determination is "Yes", the processing proceeds to step S205. However, if the determination is "No", the processing proceeds to step S206. In step S205, a preliminary ejection pattern (refer to the table number 21' shown in FIG. 5) is set in the merge table.

In step S206, a white space pattern (refer to the table number 22' shown in FIG. 5) is set in a predetermined area, at the center of which is the splice 20. This white space represents an unprintable area in which printing is not performed. In step S207, it is determined whether the first pattern subsequent to the white space is a clog monitor pattern (Yes) or not (No) by referring to the print instruction table. If the determination is "Yes", the processing proceeds to step S208. However, if the determination is "No", the processing proceeds to step S209. In step S208, a clog monitor pattern (refer to the table number 23' shown in FIG. 5) is set immediately after the while space in the merge table. In step S209, it is determined whether a preliminary ejection operation is needed (Yes) or not (No) immediately after the white space. If the determination is "Yes", the processing proceeds to step S210. However, if the determination is "No", the sequences are completed. In step S210, preliminary ejection patterns and a cut mark (refer to the table numbers 24' to 26' shown in FIG. 5) are set at the end of the merge table.

After the merge table is generated, the control unit performs control so that processing next to the processing based on the table number 19 is performed using the merge table (refer to the table numbers 20' to 26'). Subsequently, the processing returns to that based on the table number 20. In this way, the printing operation continues. As described above, the print instruction table is updated and the predefined print sequence is changed so that if a splice is detected by the splice sensor 17, the unprintable area including the splice is defined as a white space. In addition, a maintenance pattern is printed in an area after the unprintable area. Thus, the printing operation continues while avoiding the unprintable area so that the unprintable area is not used. Even when the nozzle is clogged due to dried ink while the unprintable area is passing beneath the print head, the maintenance of the print head is performed immediately after the unprintable area has passed. Thus, the occurrence of an artifact of the subsequent images can be prevented. Furthermore, when a maintenance pattern is needed in an unprintable area, the maintenance of the print head is performed in advance before the unprintable area is reached. Thus, the print head can be maintained in an excellent state.

Still furthermore, even when the merge table is merged and an interruption process is performed, the order in which unit images are arranged remains unchanged. In some cases (e.g., the case of printing of a photo album), the order in which images are continuously printed (the order in which pages are arranged) is important. In such cases, if the order in which images are printed is changed, the user needs to rearrange the printed images. The present embodiment can prevent such a troublesome operation.

A modification of the above-described embodiment is described next. In the above-described example, if a splice is detected, a merge table is merged. Thereafter, a printing operation continues without changing the subsequent print order. In contrast, according to the modification, if a splice is detected, a merge table is merged. In addition, the subsequent print order is changed so that the position at which a maintenance pattern is inserted is more appropriate.

Figure 7A:
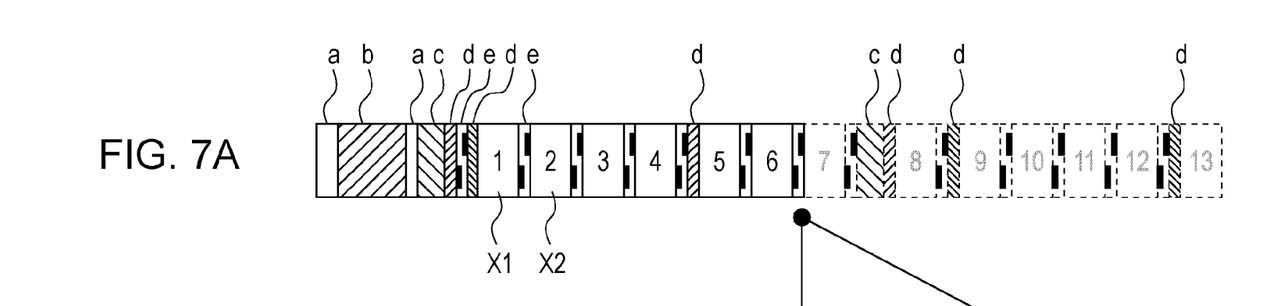
FIGS. 7A and 7B illustrate an example of a modification of FIGS. 4A and 4B.
Figure 7B:
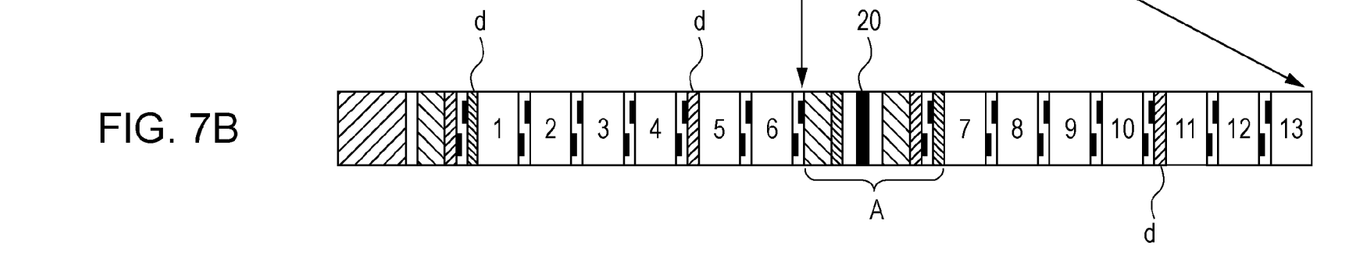
Figure 8:
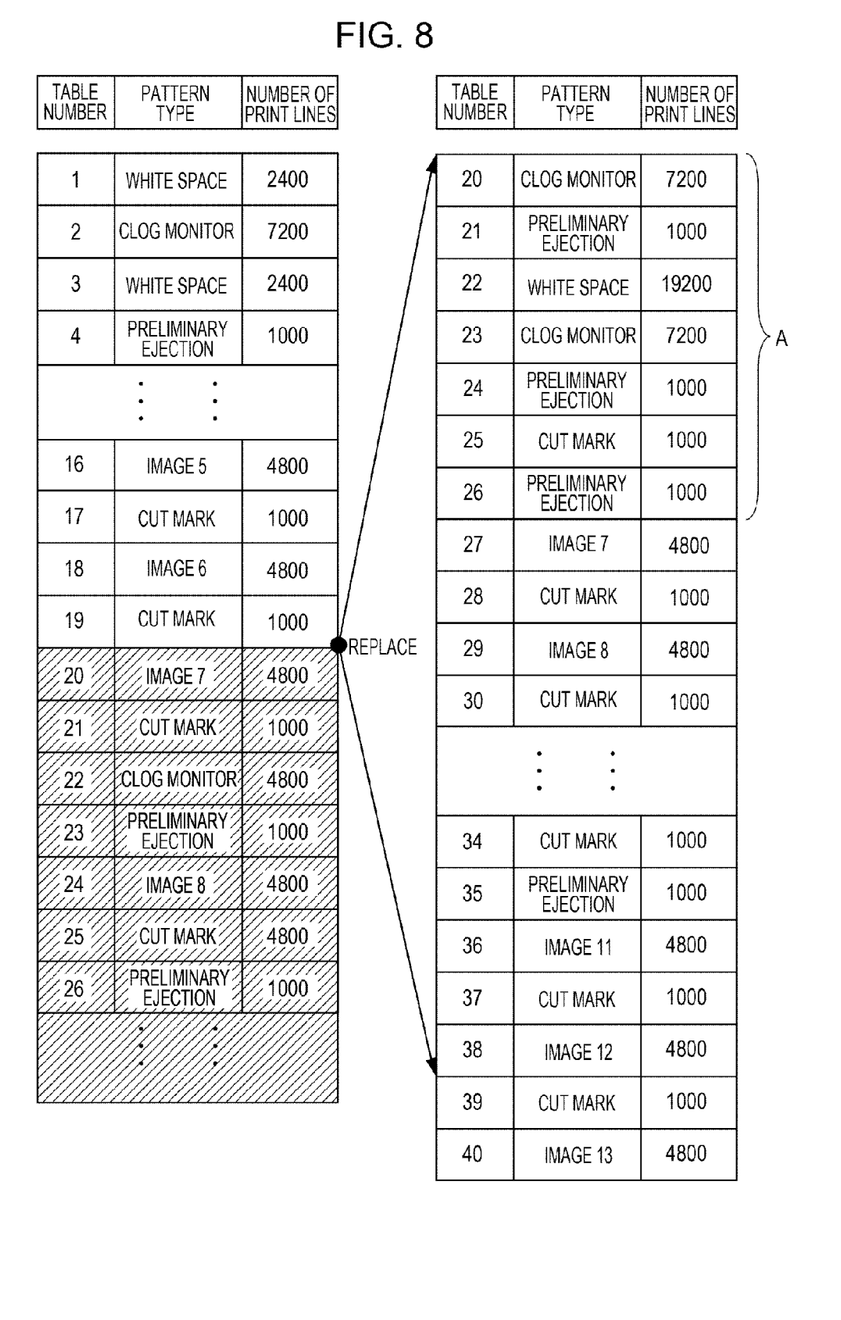
FIG. 8 illustrates an example of a modification of FIG. 5.

Like FIGS. 4A and 4B, FIGS. 7A and 7B illustrate the order in which unit images and maintenance patterns are sequentially printed on the continuous sheet S in accordance with the information in a print instruction table. Like FIG. 5, FIG. 8 illustrates the procedure for updating an initial print instruction table. The same numbering will be used in describing FIG. 8 as was utilized above in describing FIG. 5, where appropriate. In this example, the order of data items subsequent to the data item having the table number 19 in the initial print instruction table is changed. Thus, the data items subsequent to the data item having the table number 20 are replaced with new data items. As used herein, this operation is referred to as "rescheduling".

In the example shown in FIGS. 4A and 4B, the arrangement of the data items subsequent to the merged data item A after updating is exactly the same as that before updating. In the arrangement of unit images, the position at which a maintenance pattern is inserted remains unchanged before and after the updating. Accordingly, as shown in FIG. 4B, the case in which a maintenance operation (refer to the clog monitor pattern and the preliminary ejection pattern immediately after a unit image 7) is performed again immediately after a maintenance operation defined by the merge table has been performed may occur. In contrast, in the example shown in FIGS. 7A and 7B, rescheduling is performed as illustrated in FIG. 7B so that after the merge data A is printed, four unit images are printed and a preliminary ejection operation is performed. Accordingly, unlike the case shown in FIG. 4B, an excessive maintenance operation is not performed. Since the possibility of an excessive maintenance operation being performed in the print operation subsequent to the splice 20 is reduced, wastage of the continuous sheet can be reduced. In addition, the total throughput can be increased.

Figure 9:
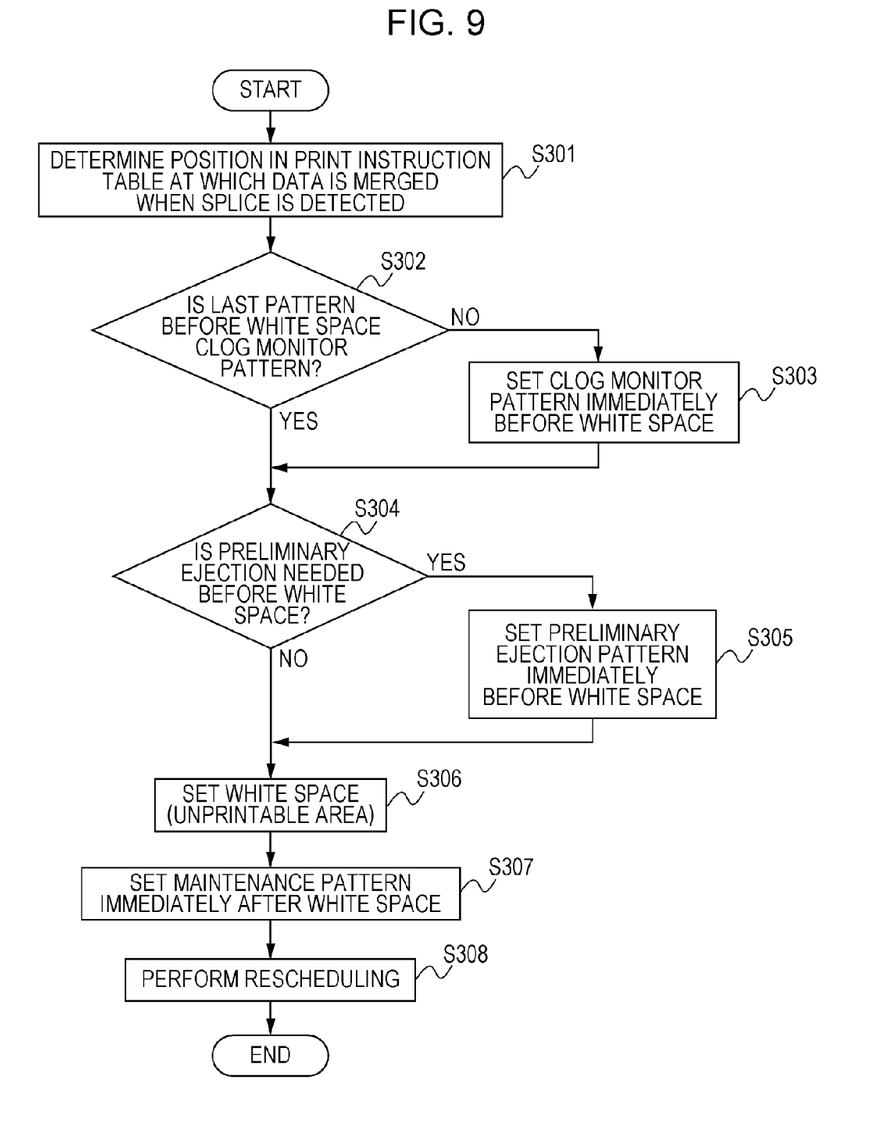
FIG. 9 is a flowchart of the procedure of a process performed in the modification.

FIG. 9 is a flowchart of the procedure for updating the print instruction table in step S105 according to the modification. In step S301, when the splice 20 is detected, it is determined at which point of the print instruction table the merge table is merged. The point is determined by performing computation using the point (the timing) at which the splice sensor 17 detects the splice 20 and the number of print lines in the print instruction table. In step S302, it is determined whether the last pattern before merge is a clog monitor pattern (Yes) or not (No) by referring to the print instruction table. If the determination is "Yes", the processing proceeds to step S304. However, if the determination is "No", the processing proceeds to step S303, where a clog monitor pattern (refer to the table number 20 shown in FIG. 8) is set at the top of the merge table. In step S304, it is determined whether a preliminary ejection operation is needed (Yes) or not (No) using the print pattern before merge. If the determination is "Yes", the processing proceeds to step S305. However, if the determination is "No", the processing proceeds to step S306. In step S305, a preliminary ejection pattern (refer to the table number 21 shown in FIG. 8) is set in the merge table. In step S306, a white space pattern (refer to the table number 22 shown in FIG. 8) is set in a predetermined area, at the center of which is the splice 20. The white space pattern indicates an unprintable area in which image printing is not suitable. In step S307, maintenance patterns and a cut mark are set immediately after the white space in the merge table (refer to the table numbers 23 to 26 shown in FIG. 8).

The following processing procedure differs from that illustrated in FIG. 6. In step S308, rescheduling is performed on the basis of the number of unit images to be printed in an area after the splice 20. The point in the arrangement of the unit images at which a maintenance pattern is inserted is optimized. Since the maintenance pattern is printed in an area immediately after the unprintable area, a maintenance operation is not needed for a certain period of time after that. A maintenance pattern is formed at predetermined intervals after the end of the merge table (the maintenance pattern immediately after the unprintable area: the table number 26). The predetermined intervals vary in accordance with the size of the unit image in the conveying direction (the number of print lines). In this example, the point at which a maintenance pattern is inserted is re-defined so that a preliminary ejection operation is performed each time four unit images or a set of three unit images and one clog monitor pattern are printed.

According to the above-described embodiments, since the maintenance of the print head is performed by avoiding an image from being printed in a splice and forming a maintenance pattern in an area subsequent to the splice, an image artifact does not occur. Thus, images are excellently printed in an area subsequent to the splice. In addition, in rescheduling, only the timing of a maintenance operation is changed, and the order in which the unit images are arranged remains unchanged. Accordingly, even when the order in which images are continuously printed (the order in which pages are arranged) is important, the user need not perform a troublesome operation to rearrange the unit images.

In the above-described examples, since a splice of a continuous sheet is not suitable for image printing, the splice is defined as an unprintable area. However, in addition to a splice, an area of a continuous sheet that is not suitable for image printing is present. Examples of the area that is not suitable for image printing include damage, a fold line, a break, a large dust particle, and a stain (water-based or oil-based) that are partially attached to a continuous sheet during manufacture and that are not suitable for image printing. As used herein, these defects are correctively referred to as a "stain on a continuous sheet". The examples of the area that is not suitable for image printing further include a marking portion of a continuous sheet that are intentionally marked on the sheet, such as a symbol or a mark. If printing is performed for such an area that is not suitable for image printing, the print quality is significantly degraded, and the printout becomes defective. Accordingly, control may be performed as follows: such an area that is not suitable for image printing is detected using a detection unit, an unprintable area is defined in the above-described manner, and the order in which unit images are printed is changed in order to print a maintenance pattern in an area subsequent to the unprintable area. Since an area that is not suitable for image printing is optically detectable, the above-described splice sensor can be employed as the detection unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method comprising:
feeding a continuous sheet;
printing, by using an inkjet print head for ejecting ink, a unit image and a maintenance pattern for maintaining a characteristic for ejecting the ink by the inkjet print head in a determined order on the fed continuous sheet;
detecting an unsuitable area that is not suitable for printing on the fed continuous sheet;
defining an unprintable area, including the unsuitable area, where the unit image is not to be printed on the continuous sheet if the unsuitable area is detected;
determining whether a first pattern to be printed subsequently to the unsuitable area is the maintenance pattern in the determined order; and
printing the maintenance pattern in an area subsequent to the unprintable area before the unit image is printed if it is determined that the first pattern to be printed subsequently to the unsuitable area is not the maintenance pattern.

2. The method according to claim 1, wherein the unsuitable area represents one of a splice, a portion having a stain, and a preset marking portion of the continuous sheet.

3. The method according to claim 1, wherein the maintenance pattern is additionally printed in an area preceding the unprintable area.

4. The method according to claim 1, further comprising rescheduling the determined order so that maintenance patterns are formed at intervals from the maintenance pattern formed in the area subsequent to the unprintable area.

5. The method according to claim 1, wherein the printing is performed with a plurality of the inkjet print heads.

6. The method according to claim 1, wherein, in the printing, a plurality of unit images is printed, and, an order of printing of the plurality of unit images is not changed.

7. The method according to claim 1, wherein, in the printing, another maintenance pattern is further printed.

8. The method according to claim 1, wherein the printing of the maintenance pattern in an area subsequent to the unprintable area before the unit image is printed is performed by interrupting the determined order.

9. The method according to claim 1, wherein the printing of the maintenance pattern in an area subsequent to the unprintable area before the unit image is printed is performed by changing the determined order.

10. The method according to claim 1, wherein the maintenance pattern includes a clog monitor pattern.

11. The method according to claim 1, wherein the maintenance pattern includes a preliminary ejection pattern.

12. A control method for controlling a printing apparatus, the printing apparatus comprising:
   a sheet feeding unit configured to feed a continuous sheet along a path;
   a printing unit, having an inkjet print head, configured to perform a print operation; and
   a detection unit, disposed between the sheet feeding unit and the printing unit in the path, configured to detect a splice of the continuous sheet,
   the control method comprising:
   causing the printing unit to print a plurality of images on the continuous sheet and to form a maintenance pattern for maintaining the inkjet print head on the continuous sheet between one of the images and a next one of the images, according to a determined order;
   causing the detection unit to detect the splice;
   defining an unprintable area, including the splice, where the image is not to be printed on the continuous sheet if the detection unit detects the splice;
   determining whether a first pattern to be printed subsequently to the splice is the maintenance pattern in the determined order; and
   printing the maintenance pattern in an area subsequent to the unprintable area before one of the images is printed it is determined that a first pattern to be printed subsequently to the splice is not the maintenance pattern.

13. The control method according to claim 12 wherein the maintenance pattern is additionally printed in an area preceding the unprintable area.

14. The control method according to claim 12, further comprising rescheduling change of the determined order so that maintenance patterns are formed at intervals from the maintenance pattern formed in the area subsequent to the unprintable area.

15. The control method according to claim 12, wherein, if the splice passes through a position at which the splice faces the inkjet print head of the printing unit, causing the inkjet print head to temporarily moves away from the continuous sheet.

16. The control method according to claim 12, wherein the printing apparatus further comprises a reverse unit configured to reverse the continuous sheet for duplex printing, and
   wherein the method further comprises, in the duplex printing, causing the printing unit to perform printing of the plurality of images and the maintenance patterns in the determined order on a first surface of the continuous sheet fed from the sheet feeding unit, the printed sheet being reversed by the reversed unit to feed the reversed continuous sheet to the printing unit, and causing the printing unit to perform printing of the plurality of images and the maintenance patterns in the determined order on a second surface, which is the back of the first surface, of the continuous sheet fed from the reverse unit.

17. The control method according to claim 16, wherein the printing unit includes a plurality of inkjet print heads for color printing.

18. The control method according to claim 12, wherein the printing of the maintenance pattern in an area subsequent to the unprintable area before the unit image is printed is performed by interrupting the determined order.

19. The control method according to claim 12, wherein the printing of the maintenance pattern in an area subsequent to the unprintable area before the unit image is printed is performed by changing the determined order.

20. The control method according to claim 12, wherein the maintenance pattern includes a clog monitor pattern.

21. The control method according to claim 12, wherein the maintenance pattern includes a preliminary ejection pattern.

* * * * *